2,908,546

METHOD OF REDUCING THE HYDRIDE CONTENT OF ACETYLENE GENERATED FROM CALCIUM CARBIDE

Witold Szatkowski, London, England, assignor to The British Oxygen Company Limited, a British company No Drawing. Application October 4, 1956
Serial No. 613,818

Claims priority, application Great Britain October 13, 1955

8 Claims. (Cl. 23—3)

This invention relates to the purification of gases and more particularly to the removal from gases of non-metallic hydrides, such as ammonia, hydrogen sulphide, phosphine and arsine. The removal of such hydrides is of particular importance in the manufacture of acetylene from calcium carbide and the invention will be described with particular reference to acetylene. It will, however, be appreciated that the invention can be applied to the purification of other gas or gas mixture from these hydrides.

It is well known that commercial calcium carbide contains nitrides, phosphides, arsenides and sulphides and that when the carbide is reacted with water to form acetylene, these substances also react with water to form the corresponding hydrides which consequently contaminate the acetylene formed. The amount of such hydrides in the acetylene produced varies over wide limits according to the type of generator employed as well as according to variations in the quality of the calcium carbide used. Frequently, ammonia is present in the order of 0.1% by weight, phosphine and hydrogen sulphide in amounts of up to about 0.05% by weight and arsine up to about 0.01% by weight.

It is the normal practice to remove such impurities prior to using the acetylene either directly as a welding or cutting gas for chemical synthesis.

Some of the hydrides can be removed in great measure or in part by simple scrubbing with water but, in general, chemical oxidation must be employed. The materials used for such oxidation must be inactive in respect for the acetylene or other gas which is to be purified. Examples of such oxidising agents include hypochlorites, chromates and salts of metals having variable valency. Promoters or catalysts are frequently added, these usually themselves also being salts of metals of variable valency.

In use, the oxidising medium itself becomes reduced and is thereby eventually rendered inactive. In some of the purification systems used, the medium is such that it can be regenerated by appropriate treatment, such as by electrolytic oxidation or by treatment with chlorine gas, oxygen or air. It has frequently been found, however, that the number of such regenerative treatments which can be carried out on the same material is limited and that a stage is soon reached at which the purifying medium has been discarded.

It is an object of the present invention to provide a method for reducing the content of non-metallic hydrides in a gas, using a purifying medium of high efficiency, which can readily be regenerated by treatment with air or oxygen and which can sustain a substantial number of such regenerations.

It is a further object of this invention to provide such a method which can be adapted to a system of continuous operation of the purification and regeneration cycles.

According to the present invention, a method for reducing the content of non-metallic hydrides in a gas or gas mixture containing such hydrides as impurities comprises contacting the gas or gas mixture with an aqueous solution containing a ferric salt or salts, a ferrous salt or salts, or more heavy metal salts to act as promoter, phosphoric or acetic acid or salts thereof and a mineral acid, said solution being capable of regeneration by treatment with air or oxygen.

The iron salts preferred are the chlorides, but other salts may be used if desired. The total concentration of iron chlorides is preferably 15 and 35% by weight in terms of ferric chloride hexahydrate. The invention is not limited to this range, but concentrations in excess of 35% are unnecessary, and approaching 50% could lead to a liability to crystallisation; very low concentrations of iron lead to the uneconomic necessity of handling large quantities of liquor. The relative proportions of ferrous and ferric iron can be varied virtually over the whole range. Preferred ratios are somewhat dependent on the proportion of phosphoric or acetic acid present; thus at low concentrations of acid (less than about 10%), particularly satisfactory operation is obtained if the proportion of the total iron which is in the ferric state when the purification medium is fed to the purifier is within the range of 30–50% by weight, and when the liquor leaves the purifier, at a value within the range 5–20% by weight respectively; at high concentrations of acid (above about 10%) the preferred ranges are about 60–95% by weight of ferric iron when the purification medium is fed to the purifier, and 35–65% respectively when it leaves the purifier. Regeneration from the lower proportions of ferric iron back to the higher ranges desired is particularly rapid in presence of phosphoric or acetic acid or salts thereof, and the heavy metal salts.

Aqueous solutions of ferric chloride are acidic, owing to the hydroylsis of the salt to give some free acid in solution. If such solutions are treated with non-metallic hydrides, bringing about some reduction from the ferric to the ferrous state, they become still more acidic, owing to liberation of hydrochloric acid. If this solution is then incompletely reoxidised to the ferric state, as in the process of the present invention, and thereafter used successively for purification and regeneration, the solution at all times contains free mineral acid as required for the operation of the process of the present invention. If desired, additional amounts of hydrochloric acid or other mineral acid may be added and although this may bring about some minor improvement in the general operation of the process, such addition of extra acid is not essential.

Examples of heavy metal salts which are particularly useful as promoters or catalysts in the process of the present invention are the chlorides of copper, mercury and cobalt. It is preferred to have present both cupric chloride and mercuric chloride, and it is particularly preferred to have these two salts and cobalt chloride all present in the purifying medium. Preferred concentrations of cupric chloride are 1–10% by weight. Preferred concentrations of mercuric chloride are 0.1–1% by weight. Preferred concentrations of cobalt chloride are 0.1–2% by weight.

The phosphoric or acetic acid need be present in only small concentrations and 1% by weight is adequate. It may be noted that if the salts of these acids are used (for example, the alkali metal salts), the free acid will be present in the solution, because the purifying medium as a whole is appreciably acidic. It should also be noted that where phosphine is present as one of the non-metallic hydrides, the phosphoric acid content of the solution will increase with continued use of the purifying medium, since phosphoric acid is the main product of oxidation of phosphine. The efficiency of the purifying medium is in no way impaired by such build-up of phosphoric acid up to quite an appreciable concentration; in fact the medium is improved by such build up of phosphoric acid, up to concentrations of 25–40% of phosphoric acid.

A further substance which may be added to the purification medium is manganese dioxide, preferably in an amount of 0.1–0.5% by weight. Alternatively, equal results can be obtained by adding manganese chloride to the solution, and this may be preferable in some ways. In general, one of the advantages of the process of the present invention when applied to the purification of acetylene is that, in spite of the high acidity of the medium, when the iron salts are chlorides, the acetylene does not pick up any appreciable quantity of hydrogen chloride vapour, nor is there any appreciable conversion of acetylene into chlorinated hydrocarbons. The presence of manganese salts, however, is a further safeguard against the occurrence of either of these phenomena.

At present, it is a frequent practice in the acetylene industry to use solid purifying media, such as ferric chloride, or potassium dichromate and sulphuric acid held on a carrier such as kieselguhr. In cases where such solid media are regenerated by treatment with air or oxygen, the regeneration process will normally involve a loss of the acetylene held in the purifying box at the end of the purifying stage, and a further loss of acetylene when the air or oxygen remaining in the box at the end of the purification stage is purged out with incoming acetylene. One of the advantages of the process of the present invention is that both these losses may be avoided, since the purifying solution may be transferred to another vessel for regeneration. The only loss of acetylene will be that which is dissolved in the purifying solution. Such loss is always very small and may be substantially less than 0.1% of the gas purified.

It has also been found that in operating the process of the present invention and particularly using the preferred limits for ferrous/ferric iron concentrations, the rates of purification and regeneration are considerably in excess of those possible using dy purifiers or other known liquid purifying media. This enables a considerable reduction to be made in the size of equipment needed to purify a given amount of gas.

The process of the present invention can, if desired, be made perfectly continuous in operation.

The purifying liquid may be contacted with the gas during the purification stage and with air or oxygen during the regeneration stage, according to any of the well known techniques for this purpose. For example, the gas may be fed into the liquid while the latter is being rapidly stirred in a vessel, or the gas and liquid may be fed co-currently through pipes, or counter-currently in towers. Particularly satisfactory results can be achieved by using towers fitted with gas/liquid contact trays, such as are used with distillation columns, or using towers packed with inert contact material.

The invention is illustrated by the accompanying examples.

*Example 1*

A purification solution was made up as follows:

|   | G. |
|---|---|
| Ferric chloride hexahydrate | 60 |
| Ferrous chloride tetrahydrate | 50 |
| Cupric chloride dihydrate | 16 |
| Mercuric chloride | 2.0 |
| Manganese salts | 1.0 |
| Cobalt chloride | 4.0 |
| Hydrochloric acid concentrated | 36.0 |
| Phosphoric acid | 4.0 |
| Water to make 400.0 ml. | |

The solution was fed from a reservoir at a rate of 150 ml./hr. into the top of a purification tower, fitted with 7 tray type plates, the liquor flowing in the tower counter-currently with a stream of acetylene passing at a rate of 250 l./hr. and containing the following impurities per 1 cubic metre of gas: 500 mg. phosphine, 30 mg. arsine and 14 mg. hydrogen sulphide. The acetylene leaving at the top of this tower contained less than 0.1 mg./m.$^3$ of the mixture of all the impurities present in the crude gas.

The purifying liquor leaving at the bottom of the purification tower was fed by means of an air lift into the top of a regeneration tower fitted with 15 tray type plates where it met counter-currently a stream of air flowing at a rate of 80 l./hr. The liquor leaving at the bottom of this tower was returned to the reservoir to be fed back to the purification tower. This part of the transfer of the liquor was effected by gravity because the air scrubber was fitted above the acetylene scrubber. The operation was thus carried out continuously for 10 days, during which time 60 m.$^3$ of acetylene were purified. The liquor was still fully active when the test was terminated. At all times, the acetylene purified in the above experiment contained less than 2 parts per million of hydrochloric acid vapour and less than 1 part per million of other chlorine compounds.

*Example 2*

A purification solution was made up initially as follows:

|   | G. |
|---|---|
| Ferric chloride hexahydrate | 1940 |
| Cupric chloride dihydrate | 260 |
| Mercuric chloride | 32 |
| Manganous chloride tetrahydrate | 37 |
| Potassium chloride | 12 |
| Cobalt chloride | 65 |
| Phosphoric acid | 2500 |
| Water to make 10 l. | |

The solution was fed at rates varying from 3–12 l./hr. the top of the purification tower, where it flowed counter-currently against a stream of acetylene varying from 300 to 3000 l./hr. The acetylene contained an average of 300–450 mg./cu. m. of phosphine, and smaller amounts of arsine and hydrogen sulphide. The purifying liquor leaving the bottom of the purification tower was fed by the pump into the top of a regeneration tower where it was counter-current to a stream of air flowing at 1000–2000 l./hr. The liquor leaving the bottom of the tower was returned to the top of the purification tower.

The system was in operation for several months, and during the whole period the issuing acetylene contained less than 0.1 mg. of non-metallic hydrides per cu. m. of acetylene. From time to time portions of the liquor in circulation were purged from the system, and replaced by approximately equal amounts of a solution of the same composition as that shown above except for the omission of phosphoric acid.

I claim:

1. The method of reducing the content of hydrides of phosphorus, sulphur, arsenic and nitrogen in crude acetylene generated from commercial calcium carbide which comprises contacting the crude acetylene with an aqueous liquor containing in solution therein ferric chloride, ferrous chloride, at least one water-soluble inorganic salt of a heavy metal selected from the group consisting of mercury chloride, copper chloride and cobalt chloride, a substance selected from the group consisting of phosphoric acid and acetic acid, and a strong mineral acid selected from the group consisting of hydrochloric acid, sulphuric acid and nitric acid, and regenerating said liquor by treatment with an oxidising gas selected from the group consisting of air and oxygen.

2. The method of reducing the content of hydrides of phosphorus, sulphur, arsenic and nitrogen in crude acetylene generated from commercial calcium carbide which comprises contacting the crude acetylene with an aqueous liquor containing in solution therein ferric chloride, ferrous chloride, at least one water-soluble inorganic salt of a heavy metal selected from the group consisting of mercury chloride, copper chloride and cobalt chloride, a substance selected from the group consisting of phosphoric acid and acetic acid, and a strong mineral acid selected from the group consisting of hydrochloric acid, sulphuric acid and nitric acid, and regenerating said liquor by treatment with an oxidising gas selected from the group consisting of air and oxygen, the total concentration of iron chlorides in said solution being between 15 and 35% by weight expressed in terms of ferric chloride hexahydrate.

3. The method of reducing the content of hydrides of phosphorus, sulphur, arsenic and nitrogen in crude acetylene generated from commercial calcium carbide which comprises contacting the impure acetylene with an aqueous liquor containing in solution therein ferric chloride, ferrous chloride, at least one water-soluble inorganic salt of a heavy metal selected from the group consisting of mercury chloride, copper chloride and cobalt chloride, phosphoric acid in an amount of 20% to 40% by weight of the liquor, and a strong mineral acid selected from the group consisting of hydrochloric acid, sulphuric acid and nitric acid, and regenerating said liquor by treatment with an exidising gas selected from the group consisting of air and oxygen.

4. Method according to claim 1 wherein said liquor also contains a substance selected from the group consisting of manganese dioxide and manganese chloride.

5. The method of reducing the content of hydrides of phosphorus, sulphur, arsenic and nitrogen in crude acetylene generated from commercial calcium carbide which comprises contacting the crude acetylene with an aqueous liquor containing in solution therein ferric chloride and ferrous chloride, the total concentration of iron chlorides in the liquor being between 15 and 35% by weight expressed in terms of ferric chloride hexahydrate and the proportion of the total iron present in the ferric state being within the range 30-50% by weight, at least one water-soluble inorganic salt of a heavy metal selected from the group consisting of mercury chloride, copper chloride and cobalt chloride, a substance selected from the group consisting of phosphoric acid and acetic acid, in an amount of between about 1% and about 10% by weight of the liquor, and a strong mineral acid selected from the group consisting of hydrochloric acid, sulphuric acid and nitric acid, stopping the contact between the crude acetylene and the liquor when the proportion of the total iron present in the liquor in the ferric state has fallen to a value in the range 5-20% by weight, and regenerating said liquor by treatment with an oxidising gas selected from the group consisting of air and oxygen.

6. The method of reducing the content of hydrides of phosphorus, sulphur, arsenic and nitrogen in crude acetylene generated from commercial calcium carbide which comprises contacting the crude acetylene with an aqueous liquor containing in solution therein ferric chloride and ferrous chloride, the total concentration of iron chlorides in the liquor being between 15 and 35% by weight expressed in terms of ferric chloride hexahydrate and the proportion of the total iron present in the ferric state being within the range 60-95% by weight, at least one water-soluble inorganic salt of a heavy metal selected from the group consisting of mercury chloride, copper chloride and cobalt chloride, a substance selected from the group consisting of phosphoric acid and acetic acid in an amount of about 10% to about 40% by weight of the liquor, and a strong mineral acid selected from the group consisting of hydrochloric acid, sulphuric acid and nitric acid, stopping the contact between the crude acetylene and the liquor when the proportion of the total iron present in the liquor in the ferric state has fallen to a value within the range 35-65% by weight, and regenerating said liquor by treatment with an oxidising gas selected from the group consisting of air and oxygen.

7. The method of reducing the content of hydrides of phosphorus, sulphur, arsenic and nitrogen in crude acetylene generated from commercial calcium carbide which comprises contacting the crude acetylene with an aqueous liquor containing in solution therein ferric chloride, ferrous chloride, cupric chloride, mercuric chloride, cobalt chloride, a substance selected from the group consisting of phosphoric acid and acetic acid, and a strong mineral acid selected from the group consisting of hydrochloric acid, sulphuric acid and nitric acid, and regenerating said liquor by treatment with an exidising gas selected from the group consisting of air and oxygen.

8. The method of reducing the content of hydrides of phosphorus, sulphur, arsenic and nitrogen in crude acetylene generated from commercial calcium carbide which comprises contacting the crude acetylene with an aqueous liquor containing in solution therein ferric chloride and ferrous chloride, the total concentration of iron chlorides in said solution being between 15 and 35% by weight expressed in terms of ferric chloride hexahydrate, cupric chloride in an amount of between 1 and 10% by weight of the solution, mercuric chloride in an amount of between 0.1 and 1% by weight of the solution, cobalt chloride in an amount of between 0.1 and 2% by weight of the solution, phosphoric acid in an amount of between 1 and 40% by weight of the solution, and hydrochloric acid, and regenerating said liquor by treatment with an oxidising gas selected from the group consisting of air and oxygen.

References Cited in the file of this patent

UNITED STATES PATENTS

| 737,579 | Burschell | Sept. 1, 1903 |

FOREIGN PATENTS

| 16,432 of 1896 | Great Britain | Jan. 30, 1897 |
| 22,330 of 1898 | Great Britian | Oct. 21, 1899 |